C. W. SHERMAN.
RUBBING DEVICE.
APPLICATION FILED FEB. 9, 1911.
1,152,126.
Patented Aug. 31, 1915.
2 SHEETS—SHEET 1.
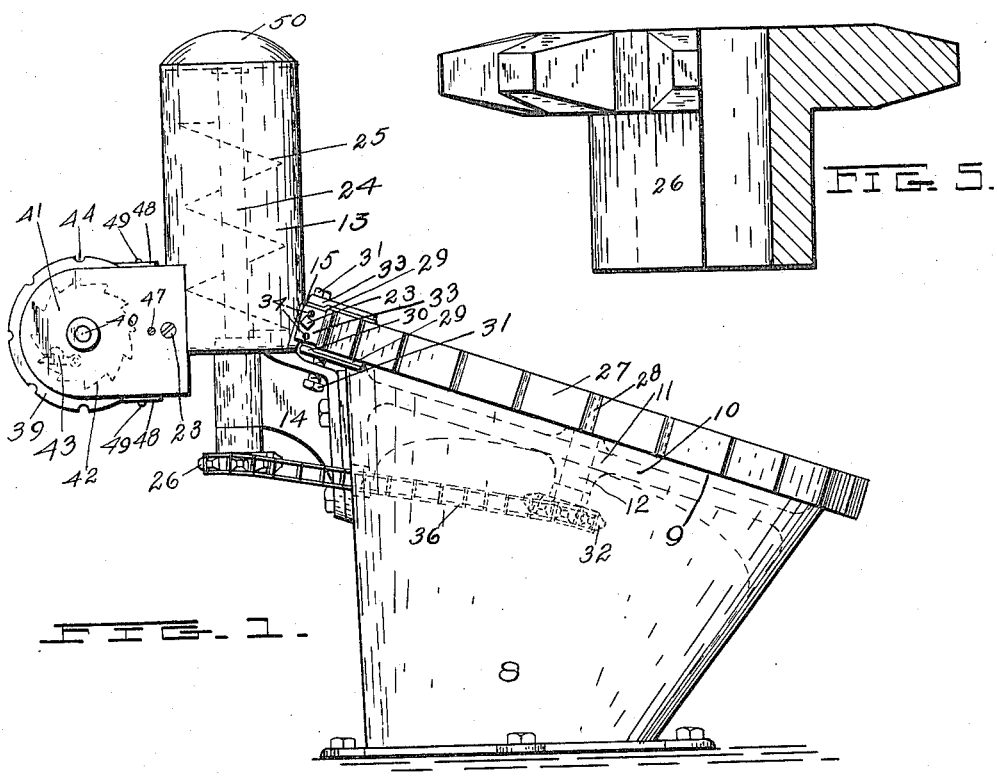
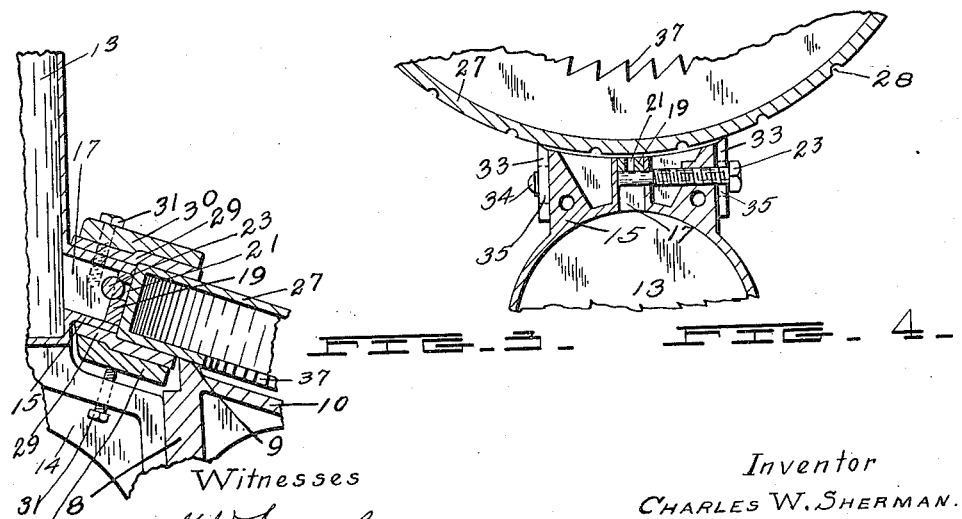
Witnesses
Inventor
CHARLES W. SHERMAN.
By
Atty.

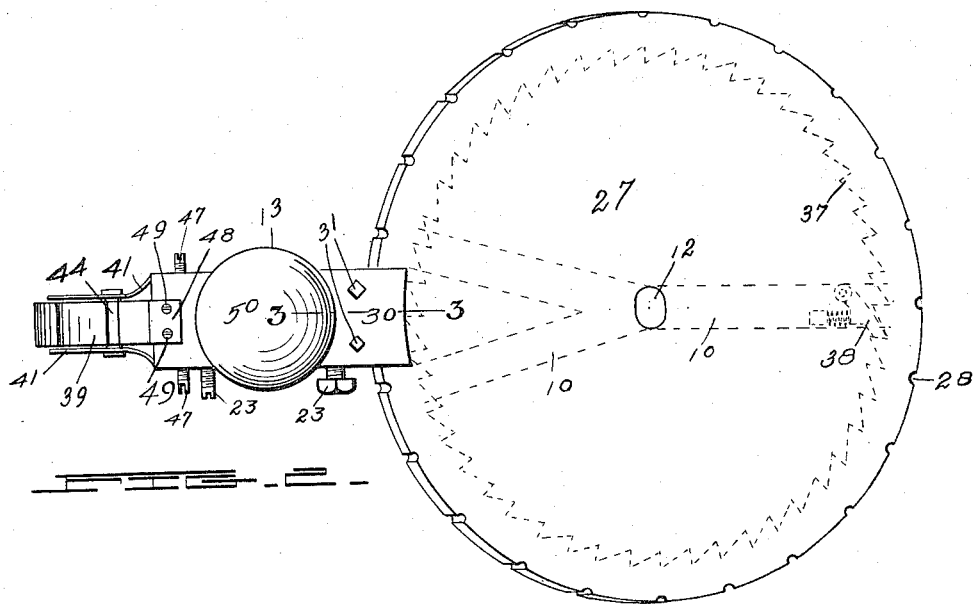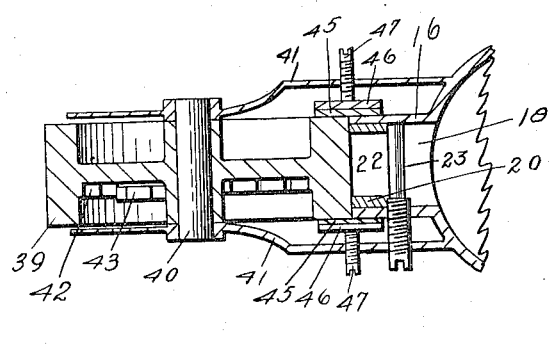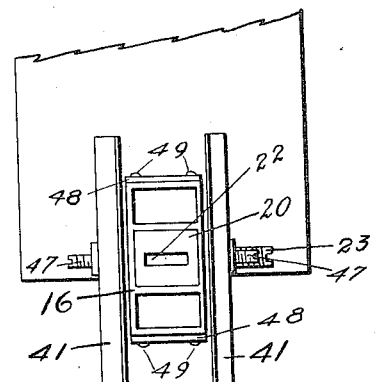

UNITED STATES PATENT OFFICE.

CHARLES W. SHERMAN, OF PEORIA, ILLINOIS, ASSIGNOR TO SHERMAN HOG-GREASER COMPANY, OF PEORIA, ILLINOIS, A CORPORATION OF WEST VIRGINIA.

RUBBING DEVICE.

1,152,126.  Specification of Letters Patent.  Patented Aug. 31, 1915.

Application filed February 9, 1911. Serial No. 607,662.

*To all whom it may concern:*

Be it known that I, CHARLES W. SHERMAN, a citizen of the United States, residing at Peoria, in the county of Peoria and State of Illinois, have invented certain new and useful Improvements in Rubbing Devices, of which the following is a specification.

This invention has reference to rubbing-devices for animals, such as hogs and the like.

The invention has for its object to improve upon that class of devices provided for the use of animals to rub their bodies against, whereby to distribute upon their bodies a suitable insecticide or disinfectant, to relieve the skin of any irritation.

The invention has for a further object to provide a rubbing-device having a force-feed for controlling the feed of grease, oil or other substance, which the animal causes to be distributed over its body when the animal rubs against the device, said force-feed being inoperative, except when the animal engages and rubs against that part of the device in operative connection with said feed.

A further object of the invention is to construct a rubbing-device with a revoluble member in operative relation with the receptacle containing the grease, oil or other substance; the feed of the grease, oil or other substance from the receptacle to the member being regulated by a suitable valve.

Another feature of my invention lies in the provision of wipers engaging with said revoluble member to prevent more than a certain quantity of the grease or oil being taken up by said member. The use of said valve and said wipers serving to prevent leakage or escape of the grease or oil from the receptacle upon variation in changes of temperature.

Other objects and advantages will be apparent from the following description, and it will be understood that modifications in the specific construction shown, may be made and that any suitable materials may be used without departing from the spirit of the invention.

In the drawings forming a portion of this specification, and in which like numerals of reference indicate similar parts in the several views:—Figure 1 is a side elevation showing my new and improved rubbing-device; Fig. 2 is a plan view of Fig. 1; Fig. 3 shows a sectional detail of parts, as the same would appear if taken on the line 3—3 of Fig. 2; Fig. 4 is a transverse sectional view, in plan, of parts shown in Fig. 3; Fig. 5 is a detail in elevation and in section, showing a sprocket wheel used on my machine; Fig. 6 is an enlarged sectional detail in plan of the smaller rubbing-wheel, and associated parts, seen in Figs. 1 and 2, and Fig. 7 is an elevation, partly in section, showing the feed opening and regulating means between the grease or oil receptacle and smaller rubbing-wheel.

Referring now to the drawings, the base as well as the support for the working parts of the device is indicated as 8, being an approximately inverted cone-shaped member, adapted to rest on the ground or be secured to some suitable rest. The upper edge of the member 8 presents an inclined surface, as at 9, for purposes to be further explained, and webs such as 10 are provided, forming a bearing 11 for a shaft 12.

13 designates a hollow receptacle, being preferably cylindrical in form, and closed at its lower end, and formed integral with said lower end is an arm or bracket 14 adapted to be secured to the wall of the base-member 8, as shown in Fig. 1, for supporting the receptacle 13 adjacent to and above the member 8. The attachment of the receptacle 13 to member 8, is adjacent the highest point of its wall, also for purposes which will be explained.

The receptacle 13 at its lower end and immediately above its closed bottom is provided with radial extensions 15 and 16, preferably diametrically opposite each other; the extension 15 being inclined downwardly, see Fig. 3, while the extension 16 projects outwardly in a horizontal plane. The extension 15 has a central opening 17 therethrough, and the extension 16 has a central opening 18 therethrough. Each of said openings 18 and 17 communicates with the interior of the receptacle and forms passageways for grease, oil or other substance contained in the receptacle and which it is intended to feed from the receptacle to rubbing wheels, to be described. In the open ends of the respective extensions 15 and 16, Babbitt-closures 19 and 20 are inserted, each of which are formed with egress openings 21 and 22, and 23 are needle-valves, preferably operating transversely across the openings 21 in the ends of extensions 15 and 16, whereby to close said openings, or upon being adjusted to open or partially close said openings, to control and govern the amount of grease, oil or other substance, fed therethrough.

Extending centrally and longitudinally through the receptacle 13, is a shaft 24, said shaft carrying an auger or force-feed screw 25, see Fig. 1. The shaft 24 passes down through the bracket 14 and on the lower end of said shaft is secured a sprocket pinion 26, similar to that shown in Fig. 5, said pinion, as shown in said last mentioned figure, being provided with extra long teeth, which are brought to an approximately pointed end, for purposes to be explained.

Revolubly carried on the upper edge 9 of the approximately inverted cone member 8 is a rubbing-wheel 27, said wheel being also secured to the shaft 12, previously referred to. The peripheral face of said wheel is notched or grooved at intervals, as at 28. The arrangement of the wheel 27, relative to the open end of the lateral extension 15 is such that the peripheral face of said wheel rotates in proximity thereto, see Fig. 4, so that grease, oil or other substance, escaping or passing through the opening 21 will lodge upon or be taken up by the surface of the wheel, and grooves or notches 28 therein. Secured to the upper and lower faces of the extension 15, are wipers 29, preferably of felt or some other absorbent substance, and said wipers extend over the upper and lower surface of the wheel 27, for a suitable distance, see Fig. 3. These wipers are suitably held in place by the covering plates 30 and bolts or screws 31. As the wheel 27 is revolved, the wipers 29 insure that no grease or oil will pass from the receptacle 13, except such as may be taken up by the peripheral face of the wheel 27, and when the wheel 27 is stationary, the wipers 29 will prevent leakage of grease or oil, even in the hottest weather. Other wipers such as 33 are secured to the opposite ends of the extension 15 by bolts 34, which pass through slots 35 in the wipers 33, whereby the wipers may be adjusted. These wipers act upon the peripheral face of wheel 27 to wipe off and hold back only a given quantity of grease or oil. On the lower end of shaft 12 is attached or secured a sprocket pinion 32 similar in all respects to pinion 26, and said pinions are connected by a flexible link-belt 36, which passes out through openings, not shown, in the wall of the base 8. It will be observed that the shaft 12 is at an angle or incline with respect to the vertical bearing of the shaft 24; but this does not interfere with the operation of chain 36, as the character of the pinions 26 and 32 and their teeth make it possible for the chain to leave the pinions in the manner shown in Fig. 1 without in any way affecting or interfering with the operation of said chain. This has been demonstrated by actual use of the device.

The wheel 27 is formed with an internal series of ratchet teeth 37, see Fig. 2, and 38 is a spring held dog engaging said teeth and adapted to ride over said teeth, when the wheel is rotated in one direction, but will lock said wheel from rotation in the opposite direction. The dog is fulcrumed on one of the webs or braces 10, see Fig. 2.

An animal rubbing against the wheel 27 will cause it to rotate in one direction and take up grease or oil, providing the valve stem is adjusted to permit the grease or oil to pass from the receptacle 13 to the wheel 27. The rotation of the wheel 27 by the animal, will operate the pinion 32 and it in turn will operate the auger or screw 25 through the medium of the chain 36, pinion 26 and the shaft 24. Thus it will be seen, that the auger or screw is operated by rotation of wheel 27, and when the wheel is stationary there is no movement of the auger. The auger or screw produces a force-feed, obviating the use of spring pressure devices, known in the art, which are constantly acting upon the grease or oil to force it out of its container or receptacle. With a spring pressure device, constant renewing of the grease or oil is necessary, because beyond a certain point the spring is not effective; but with the use of a force-feed, such as shown, which need only be operated when needed, the supply of grease or oil need not be replenished until all the material has been forced out of the receptacle.

Supporting the wheel 27 on an incline, as shown, has an advantage, in that small as well as large animals may use the same to rub against. Also, an animal will start to rub against the edge of the wheel, at or near its highest point, and will move with the wheel to its lowest point and there rub itself until its sides have been completely covered with the grease or oil.

To provide a device for the animal to rub its hams against, or its head and ears, I attach a wheel 39. This wheel 39 and associated parts, are similar to wheel 37 except that the wheel 39 rotates in a vertical plane, see Fig. 1. This wheel is journaled on a shaft 40 having a bearing in the forward ends of plates 41, between which the wheel 39 is located, said plates extending laterally from the receptacle 13 and spaced on opposite sides of the extension 16, see Fig. 6. The wheel 39 has an internal series of ratchet teeth 42 with which engages a spring held dog 43, fulcrumed to one of the plates 41.

This dog will permit the wheel 39 to rotate in one direction, but will hold it against rotation in an opposite direction. The periphery of the wheel 39 rotates in proximity to the open end of the extension 16, and is notched or grooved at intervals as at 44, see Fig. 2. 45 denote wipers, preferably made of felt or other absorbent material which are held against the ends of the extension 16 by plates 46 and bolts 47. These wipers overlap the wheel 39, and have the same function as the previously described similar wipers 29. 48 denote other wipers, see Fig. 1, which are secured to the upper and lower ends of the extension 16 by bolts or screws 49, and act upon the peripheral face of the wheel 39, having the same function as the similar wipers 33, previously described.

The auger or screw 25 acts as a force-feed, whereas the needle valves 22 and 23 serve to control the outlet openings 21 through which grease or oil may find its way to the respective wheels 27 and 39, said needle valves being easily and conveniently operated to regulate the discharge of the grease or oil. The extension 15 is inclined to correspond to the arrangement of wheel 27, whereby the feed of grease or oil is facilitated. The receptacle 13 has a cup or cover 50, to be removed when it is desired to refill or clean the receptacle 13.

The use of the Babbitt-metal blocks 19 and 20 is a cheap and convenient arrangement for the valve openings in the extensions 15 and 16, and they may be easily replaced.

What I claim is:—

1. A rubber device comprising a receptacle having an outlet, a force feed therein, a rubbing wheel positioned adjacent said outlet operatively connected with said force feed to actuate it, said rubbing wheel adapted to be actuated by animals rubbing thereagainst.

2. A rubbing device comprising a receptacle, a force feed therein, a rubbing wheel operatively connected with said force feed, and a valved outlet from said receptacle adjacent said wheel, said wheel adapted to be actuated by animals rubbing there-against.

3. A rubbing device, comprising a receptacle, a force-feed therein, a rubbing-wheel operatively connected with said feed, a valved passage between the receptacle and wheel, and wipers with which the wheel engages.

4. A rubbing device, comprising a receptacle, a force-feed therein, a rubbing-wheel operatively connected with said feed, means for locking the wheel against rotation in one direction, and a valved passage between the receptacle and wheel.

5. A rubbing device, comprising a receptacle, a force-feed therein, a rubbing-wheel operatively connected with said feed, means for locking the wheel against rotation in one direction, a valved passage between the receptacle and wheel, and wipers with which the wheel engages.

6. A rubbing device, comprising a receptacle having a discharge outlet, an auger feed in said receptacle, and a rubbing wheel supported adjacent said receptacle and outlet, and having operative connection with said auger feed to actuate it, said wheel being adapted to be actuated by animals rubbing there-against.

7. A rubbing dveice, comprising a receptacle having a plurality of discharge outlets, a force feed in said receptacle, a rubbing member located adjacent each outlet, and operative connections from one of said rubbing members to said force feed to operate the same, said rubbing members being adapted to be rotated by animals rubbing there-against.

8. A rubbing device, comprising a receptacle having an outlet, a force feed in said receptacle, a rotatable rubbing member located adjacent said outlet and adapted to be actuated by rubbing movement of animals there-against, said rubbing member having operative connection with said force feed to actuate it.

9. A rubbing device, comprising a receptacle having an outlet, a force feed in said receptacle, a rotatable rubbing member located adjacent said outlet and adapted to be actuated by rubbing movement of animals there-against, a chain and sprocket connection between said force feed and said member, whereby said force feed will be actuated from said member.

10. A rubbing device, comprising a base, a rubbing-wheel supported in an inclined position on said base, a receptacle supported by said base and having an outlet adjacent said wheel, a force-feed in said receptacle, and driving connections between said wheel and said feed said rubbing wheel being adapted to be rotated by animals rubbing thereagainst so as to operate said force feed.

11. A rubbing device, comprisng a base having an inclined upper edge, a rubbing-wheel revolubly mounted on said inclined edge of said base and having its periphery notched, a receptacle supported by said base and having an outlet adjacent said wheel, a force-feed in said receptacle, and driving connections between said wheel and said feed.

12. A rubbing device, comprising a base, a rubbing-wheel mounted on said base to rotate in a plane inclined slightly to the horizontal, a receptacle supported on said base and having two discharge openings, one communicating with said wheel, an auger-feed in said receptacle, a rubbing-wheel mounted on said receptacle near its other opening, to rotate in an approximately vertical plane, and driving connections between one of said wheels and said feed.

13. A rubbing device, comprising a receptacle, an auger-feed therein, an extension from said receptacle provided with an outlet opening, a valve for closing said opening, and a rubbing member having its rubbing portion movable adjacent said outlet opening and means for actuating said auger feed, said means being operatively connected with said rubbing member.

14. A rubbing device, comprising a receptacle, a valve controlled outlet in said receptacle, a revoluble rubbing member having its rubbing portion movable across said outlet, wipers adapted to engage said member, feeding means in the receptacle, and means for operating said feeding means when said member is actuated.

15. A rubbing device, comprising a receptacle provided with a valve controlled outlet, feeding means in said receptacle, a rubbing wheel provided with a notched periphery, driving means connecting the wheel and feeding means, wipers attached to the receptacle adjacent the outlet and overlying said wheel, and means for preventing rotation of said wheel in one direction.

16. A rubbing device, comprising a base, a rubbing wheel mounted on said base to rotate in a plane inclined slightly to the horizontal, a receptacle mounted on said base, a second rubbing wheel mounted on said receptacle to rotate in an approximately vertical plane, said receptacle having openings communicating with said wheels, a force feed in said receptacle, and driving connections between said first mentioned rubbing wheel and said force feed.

17. A rubbing device, comprising a base having an inclined upper edge, a vertically extending receptacle thereon, a shaft mounted in said receptacle and having feeding means thereon, a rubbing wheel rotatably mounted on the inclined edge of said base, said receptacle having an outlet adjacent said wheel, and driving connections between said rubbing wheel and said shaft.

18. A rubbing device, comprising a base, a rubbing wheel rotatably mounted on said base, a receptacle supported on said base, a smaller rubbing wheel mounted on said receptacle, said receptacle having openings communicating with each wheel, means to prevent the rotation of the first mentioned wheel in one direction, and means to prevent the rotation of the second mentioned wheel in one direction.

19. A rubbing device comprising a receptacle having an outlet, a feed mechanism within said receptacle adapted when actuated to force material out of said receptacle, a rubbing member located adjacent said outlet and operatively connected to said feed mechanism to actuate it to force material onto said rubbing member, said rubbing member being adapted to be actuated by animals rubbing thereagainst.

20. In a device of the class described, a support, a disk-like member rotatably mounted thereon and adapted to rotate in a plane inclined at an angle, and a grease receptacle having a place of discharge terminating adjacent to the upper surface of the member.

21. In a device of the class described, a support, a disk-like member rotatably mounted thereon and adapted to rotate in a plane inclined at an angle, a grease receptacle having a place of discharge terminating adjacent to the upper surface of the member, and means within the receptacle to positively force the grease to and upon said member.

22. In a device of the class described, a support, a disk-like member rotatably mounted thereon and adapted to rotate in a plane inclined at an angle, a grease receptacle having a place of discharge terminating adjacent to the upper surface of the member, means within the receptacle to positively force the grease to and upon said member, and a device for distributing the grease over the surface upon which it is delivered.

23. In a hog greaser the combination of a rotatable rubbing portion, means to prevent rotation of the wheel in one direction, a receptacle for grease, means for spreading the grease upon the member in the rotation of the latter, and a scraper having contact with the member and adapted for removing dirt deposits from the same in its rotation toward the grease spreading means.

24. In a hog greaser, the combination of a support, a disk-like member mounted thereon and adapted to rotate by pressure of an animal against it, means to deposit grease upon the member, a grease spreading device lying upon the surface of the member, and a scraping device in contact with the member and beneath which the latter passes in its rotation toward the said spreading device.

25. In a hog greaser, the combination of a support, a disk-like member mounted thereon and adapted to rotate by pressure of an animal against it, a grease spreading device lying upon the surface with which the animal has contact, and a conduit for grease extending through the device.

26. In a hog greaser, the combination of a support, a disk-like member mounted thereon and adapted to rotate by pressure of an animal against it, and a grease spreading device at the edge of the member and adapted to lie upon the surfaces thereof with which the animal has contact.

27. In a hog greaser, the combination of a support, a disk-like member mounted thereon and adapted to rotate by pressure of an animal against it, a grease spreading device at the edge of the member and adapted to lie upon the surfaces thereof with which the animal has contact, and a scraping device lying upon the surface of the member, the latter adapted to rotate from the scraping device toward the said spreading device.

28. In a hog greaser, the combination of a support, a member rotatably mounted thereon and adapted to be rotated by pressure of an animal against it, a receptacle for grease having a place of discharge opposite one of the surfaces of the member, mechanism within the receptacle to positively force the grease upon the member, driving connections carried by the member and the said mechanism for operating the latter in the rotation of the former, and means to prevent the rotation of the member in one direction.

29. In a hog greaser, the combination of a support, a member rotatably mounted thereon and adapted to be rotated by pressure of an animal against it, a receptacle for grease having a place of discharge opposite one of the surfaces of the member, mechanism within the receptacle to positively force the grease upon the member, driving connections carried by the member and the said mechanism for operating the latter in the rotation of the former, a spreading device for the grease, the direction of rotation of the member being such as to carry the grease toward the spreading device, and mechanism to prevent rotation of the member in the opposite direction.

30. In a hog greaser, the combination of a support, a member rotatably mounted thereon and adapted to be rotated by pressure of an animal against it, a receptacle for grease having a place of discharge opposite one of the surfaces of the member, mechanism within the receptacle to positively force the grease upon the member, driving connections carried by the member and the said mechanism for operating the latter in the rotation of the former, a part including a spreading device and a scraping device lying in close proximity to the member, the direction of rotation of the latter being such as to carry away from the scraping device the grease being deposited from the receptacle and pass it to the spreading device, and mechanism to prevent rotation in the opposite direction.

In testimony whereof I affix my signature, in presence of two witnesses.

CHARLES W. SHERMAN.

Witnesses:
CHAS. N. LA PORTE,
J. W. NAYLOR.

Copies of this patent may be obtained for five cents each, by addressing the "Commissioner of Patents, Washington, D. C."